(12) United States Patent
Walli

(10) Patent No.: US 8,397,429 B2
(45) Date of Patent: Mar. 19, 2013

(54) METHODS AND APPARATUS FOR FACILITATING THE GERMINATION OF SEEDS AND GROWTH OF SEEDLINGS

(75) Inventor: Christian Walli, Richmond (CA)

(73) Assignee: C. Walli Ventures Inc., Richmond (CA)

( * ) Notice: Subject to any disclaimer, the term of this patent is extended or adjusted under 35 U.S.C. 154(b) by 0 days.

(21) Appl. No.: 13/008,803

(22) Filed: Jan. 18, 2011

(65) Prior Publication Data

US 2012/0180387 A1 Jul. 19, 2012

(51) Int. Cl.
*A01G 9/10* (2006.01)

(52) U.S. Cl. .................... 47/66.7; 47/58.1 R

(58) Field of Classification Search ........... 47/60, 61, 47/63, 65.5, 65.8, 66.7, 73, 74, 77, 58.1 SE, 47/65.7, 66.6, 58.1 R
See application file for complete search history.

(56) References Cited

U.S. PATENT DOCUMENTS

| | | | |
|---|---|---|---|
| 1,331,261 A * | 2/1920 | Hornsby | 47/74 |
| 3,733,745 A * | 5/1973 | Ingerstedt et al. | 47/77 |
| 3,923,729 A | 12/1975 | Clendinning et al. | |
| 4,047,329 A | 9/1977 | Holt | |
| 4,769,945 A * | 9/1988 | Motoyama et al. | 47/57.6 |
| 5,651,214 A | 7/1997 | Zucker et al. | |
| 5,983,566 A * | 11/1999 | Enderlein et al. | 47/73 |
| 6,038,813 A | 3/2000 | Moore et al. | |
| 6,378,247 B1 | 4/2002 | Takahashi | |
| 7,003,914 B2 * | 2/2006 | Legro et al. | 47/58.1 SE |
| 7,681,359 B2 | 3/2010 | Van de Wetering et al. | |
| 2003/0005865 A1 * | 1/2003 | Washburn | 111/114 |
| 2006/0032122 A1 * | 2/2006 | Chang | 47/58.1 SE |
| 2006/0213786 A1 * | 9/2006 | Walser | 206/216 |
| 2009/0241417 A1 * | 10/2009 | Smith | 47/66.2 |
| 2011/0162270 A1 * | 7/2011 | Larsen | 47/65.7 |

FOREIGN PATENT DOCUMENTS

| | | |
|---|---|---|
| DE | 3242815 | 5/1984 |
| DE | 3641566 | 9/1988 |
| EP | 1561374 | 10/2005 |
| FR | 2692432 | 12/1993 |
| GB | 2280836 | 2/1995 |
| GB | 2414913 | 12/2005 |
| JP | 10309134 | 11/1998 |

\* cited by examiner

*Primary Examiner* — Rob Swiatek
*Assistant Examiner* — Lisa Tsang
(74) *Attorney, Agent, or Firm* — Oyen Wiggs Green & Mutala LLP

(57) ABSTRACT

Methods and apparatus for facilitating the germination of seeds and growth of seedlings. One aspect of the invention provides a seed kit. The seed kit may comprise a biodegradable germination cup having a base having one or more apertures, a one-piece biodegradable germination pad capable of retaining water and sized to be received in the base of the germination cup without falling through the one or more apertures, and a biodegradable seedling cup sized to receive the germination cup. The seed kit may further comprise other components, such as a growth medium, a seed, a lid/base, a stirring stick, etc. Another aspect of the invention relates to methods wherein a seed is germinated and nurtured to a seedling by using a germination pad, a germination cup, and a seedling cup.

14 Claims, 5 Drawing Sheets

METHODS AND APPARATUS FOR FACILITATING THE GERMINATION OF SEEDS AND GROWTH OF SEEDLINGS

TECHNICAL FIELD

The present invention relates to the growth of trees and other plants. Particular embodiments provide methods and apparatus for facilitating the germination of seeds and growth of seedlings.

BACKGROUND

Recent years have seen an increase in public awareness and concern over environmental issues, particularly the prospect of global warming resulting from increased carbon dioxide emissions into the atmosphere. One possible approach to combat global warming is to plant more trees and other plants, thereby providing a replenished means for carbon dioxide absorption from the atmosphere. Planting trees and other plants may also contribute to the health of the environment by reducing pollution and soil erosion and replenishing wildlife habitat.

Growing trees or other plants from seed is not always a simple task. When seeds are planted directly into soil, cold or heat, herbivorous insects, rodents, birds, etc, may prevent successful seed germination and seedling growth. As a result, techniques have evolved to plant seeds in separate containers and then transplant germinated seeds or seedlings into soil when conditions become more favorable. To successfully germinate seeds, nurture them to seedlings and then transplant the seedlings into soil often requires considerable skill and experience.

There is a general desire to provide techniques for facilitating the germination of seeds and growth of seedlings.

BRIEF DESCRIPTION OF DRAWINGS

In drawings which show non-limiting embodiments of the invention.

DETAILED DESCRIPTION

Figure 1:
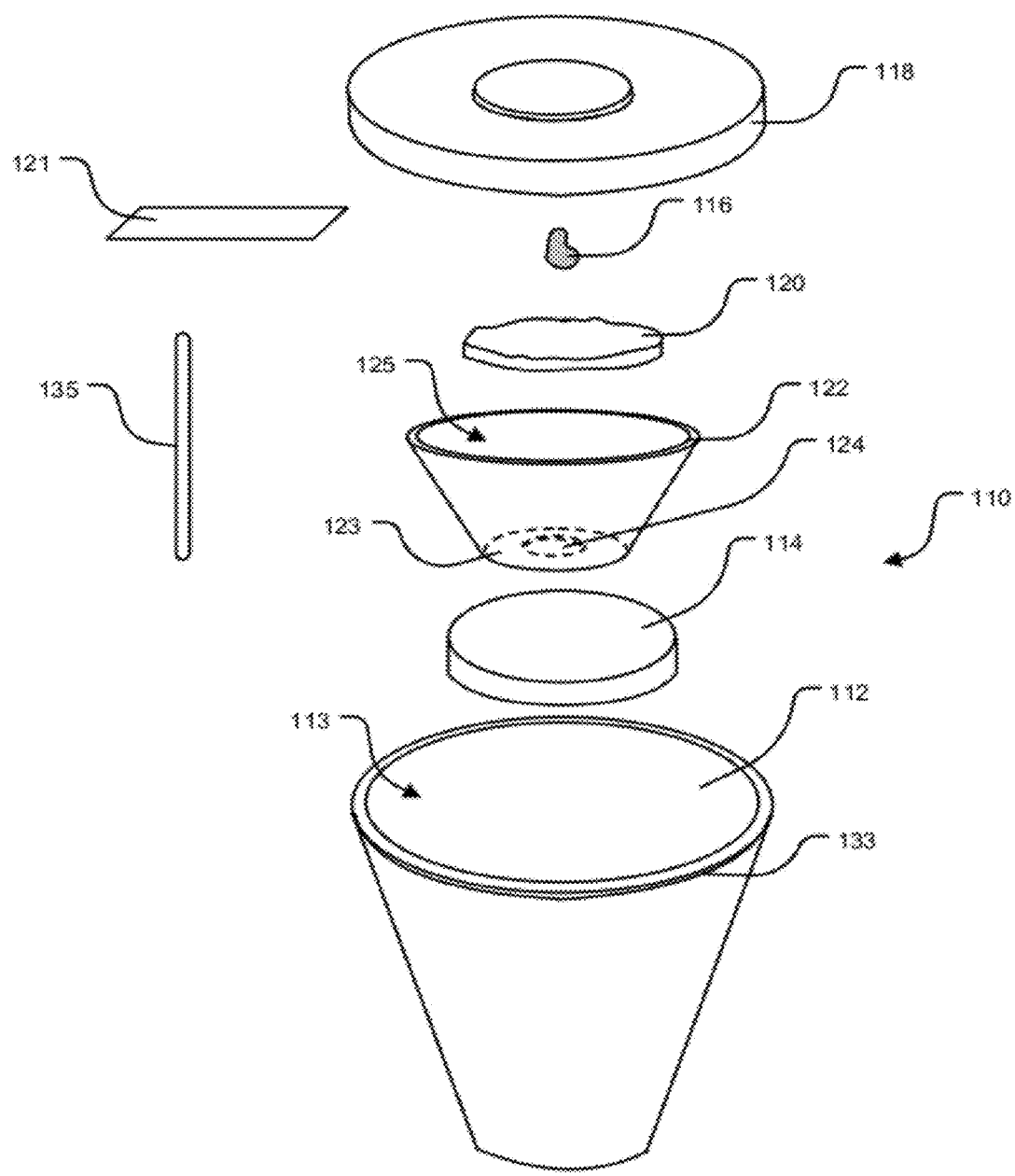
FIG. 1 shows an exploded view a seed kit according to an example embodiment of the invention.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

One aspect of the invention provides a seed kit for facilitating the germination of seeds and growth of seedlings. The seed kit comprises: a germination cup shaped to define a germination cup concavity, the germination cup concavity having an apertured base; and a one-piece germination pad sized to be received in the germination cup concavity and to abut against the apertured base while occupying substantially an entirety of the surface area thereof, the germination pad capable of absorbing and retaining water and sufficiently rigid, when wetted with water, to avoid falling through the apertured base. A seed may be placed in the germination cup and atop the wetted germinated pad, the wetted germination pad providing the seed with moisture to promote germination and wherein roots of the germinated seed extend downwardly, through the germination pad and through the apertured base. The germination cup and the germination pad may be fabricated from biodegradable materials.

Another aspect of the invention provides an apparatus for facilitating the germination of a seed and growth of a seedling. The apparatus comprises: a germination cup shaped to define a germination cup concavity, the germination cup concavity having an apertured base; a one-piece germination pad located in the germination cup concavity and abutting against the apertured base, the germination pad fabricated from a material capable of absorbing and retaining water and sufficiently rigid, when wetted with water, to avoid the germination pad falling through the apertured base. A seed is received in the germination cup atop the wetted germination pad, the wetted germination pad providing the seed with moisture to promote germination and wherein roots of the germinated seed extend downwardly, through the germination pad and through the apertured base. The germination cup and the germination pad may be fabricated from biodegradable materials.

Another aspect of the invention provides a method for facilitating the germination of a seed and growth of a seedling. The method involves: providing a germination cup shaped to define a germination cup concavity, the germination cup concavity having an apertured base; placing a seed on a one-piece germination pad, the germination pad abutting against the apertured base while occupying substantially an entirety of the surface area thereof; moistening the germination pad by introducing water to the germination cup concavity, the water absorbed and retained by the germination pad, the germination pad sufficiently rigid, when wetted with water, to avoid falling through the apertured base, the wetted germination pad providing the seed with moisture to promote germination; and permitting roots of the germinated seed extend downwardly, through the germination pad and through the apertured base.

FIG. 1 shows a seed kit 110 according to an example embodiment of the invention. Seed kit 110 comprises a seedling cup 112, a germination pad 120, and an apertured germination cup 122. In the illustrated embodiment, seed kit 110 also comprises a number of optional components including a seed 116, a lid/base 118, a growth medium (such as peat pellet 114), a stirring stick 135, and an instruction sheet 121.

Seedling cup 112 defines a cup-shaped concavity 113 which may be used to hold other components of seed kit 110 when seed kit 110 is not in use, during transport or storage of seed kit 110 and/or when seed kit 110 is displayed for retail sale and/or the like. When seed kit 110 is used for germinating seed 116 and growing a seedling, seedling cup 112 may function as a container to hold germination cup 122 as well as the growth medium (e.g. peat 114) in concavity 113.

Seedling cup 112 may be fabricated from a biodegradable material and, in some embodiments, comprises a biodegradable material which will be stable for sufficiently long to permit seed 116 to grow into a seedling but which will decompose within weeks of being buried in the ground. Suitable biodegradable materials for fabricating seedling cup 112 include, without limitation, paper, cotton, beeswax, straw, synthetic biodegradable polymers, and/or the like. Seedling cup 112 may be printed with a marketing message, business name, sponsor logo and/or the like.

Germination cup 122 may also be fabricated from a biodegradable material which may be the same as or different from the material used to fabricate seedling cup 112. Germination cup 122 also defines a cup-shaped concavity 125. Base 123 of germination cup 122 defines one or more apertures 124 that penetrate therethrough. As explained in more detail below, germination cup 122 functions to contain seed 116 during germination and to subsequently transport the germinated seedling into seedling cup 112.

Germination pad 120 may also be biodegradable (e.g., paper- or cotton-based). Germination pad 120 may be a one-piece pad and is sized to be received atop base 123 of germination cup 122 without falling through aperture(s) 124. Germination pad 120 may be made of fibrous or porous material and allow roots to penetrate through it by winding their way through the pores of the pad. Advantageously, however, germination pad 120 may be provided without direct (e.g. straight) apertures which would easily permit peat or other growth medium to fall through germination pad 120. Germination pad 120 may be placed on base 123 of germination cup 122 and seed 116 may be placed atop germination pad 120. Germination pad 120 serves as a support for seed 116, preventing seed 116 from falling through aperture(s) 124. Germination pad 120 also absorbs and retains water to keep seed 116 moist during seed germination. Germination pad 120 may provide a number of advantages, including: (i) it is of one-piece construction and thus is not messy and will not fall through aperture 124; (ii) it is made of fibrous or porous material and allows roots to grow right through it; and (iii) it is capable of absorbing and retaining water without falling apart of the time scale of germination (e.g. germination pad may be designed to biodegrade or otherwise fall apart on a time scale greater than twice the typical time required for germination of a particular seed). In a particular embodiment, germination pad 120 comprises a compressed cotton pad which provides the above-listed advantages.

Figure 2:
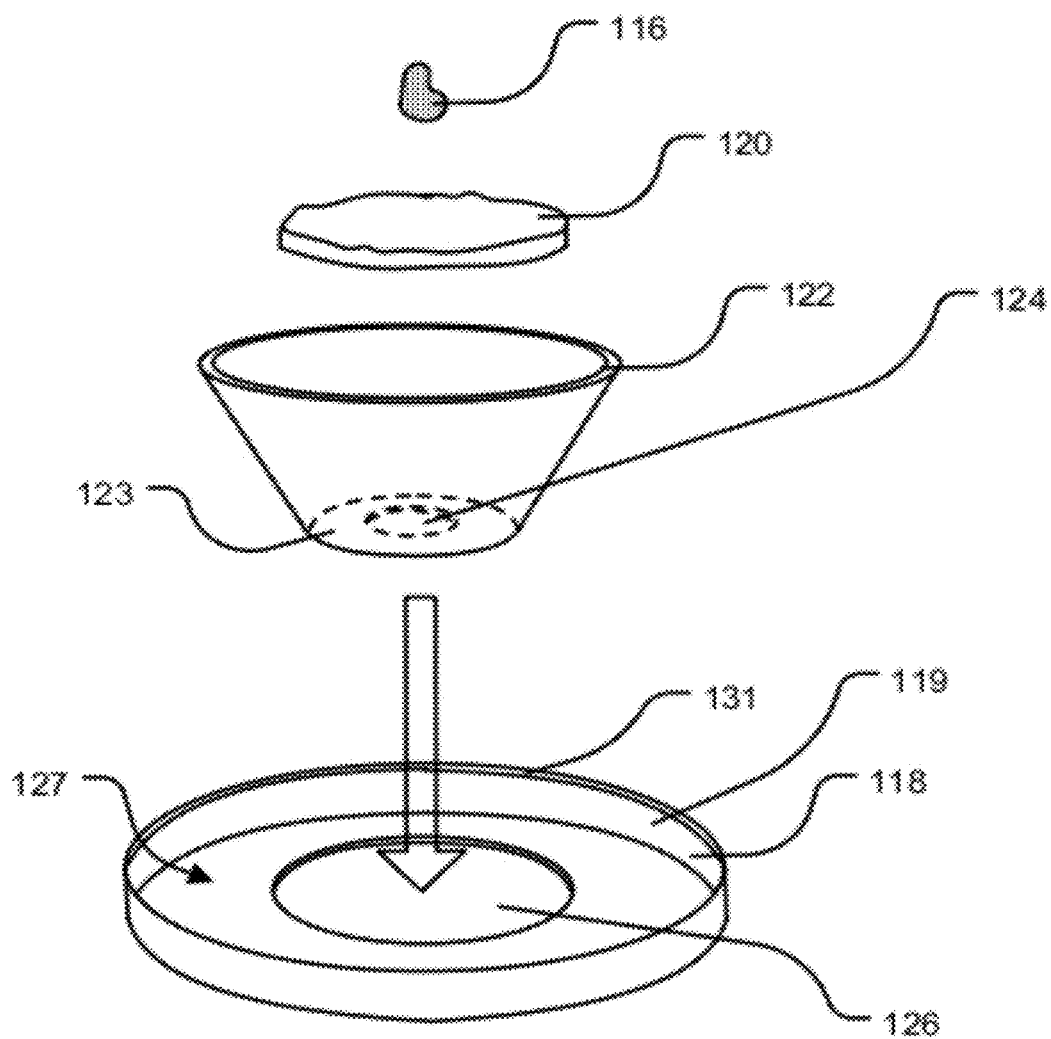
FIG. 2 shows an exploded view of some components (i.e., a seed, a germination pad, a germination cup and a base/lid) of the FIG. 1 seed kit which may be used for germinating a seed.

Optional lid/base 118 of seed kit 110 has a concave surface 119 that defines a primary concavity 127 (FIG. 2). In the illustrated embodiment, concave surface 119 also defines a smaller, secondary concavity 126 within primary concavity 127. When the components of seed kit 110 are housed within seed cup 112 (e.g. for transport, storage, display and/or the like), lid/base 118 may be oriented with its concave surface 119 facing toward seedling cup 112 (FIG. 1). Lid/base 118 may be sized such that its rim 131 is coupleable to a rim 133 of seedling cup 112. The coupling of lid/base rim 131 to seedling cup rim 133 may involve deformation of one or both of lid/base 118 and seedling cup 112, such that restorative deformation forces associated with such deformation for a "snap together" coupling. Such a coupling allows lid/base 118 to be secured over the rim 133 of seedling cup 112 to house the other components of seed kit 110 in seed cup 112.

As explained in more detail below, lid/base 118 may also be used as a base for germination cup 122 or seedling cup 112 when seed kit 110 is used for germinating a seed and growing a seedling. Primary and secondary concavities, 127, 126 allow lid/base 118 to be used to measure water to wet germination pad 120 and peat pellet 114 and to function as a water dish for seedling cup 112.

In the illustrated embodiment, germination pad 120, germination cup 122, seedling cup 112, and lid/base 118 are shown to have generally circular cross-sectional shapes and perimeters. This is not mandatory. Germination pad 120, germination cup 122, seedling cup 112, and lid/base 118 may have other cross-sectional shapes or perimeters, such as, for example, oval, square, rectangle, polygon, etc.

Seed kit 110 may optionally include a peat pellet 114 made of compressed peat or some other suitable growth medium. When water is added to peat pellet 114, peat pellet 114 absorbs water and tends to inflate or expand its volume to provide a growth medium for the germinated seed and seedling. Peat represents one suitable growth medium. In other embodiments, however, seed kit 110 may include other suitable growth media. The growth media may optionally comprise a fertilizer (e.g., liquid or powder fertilizer) or such fertilizer may optionally be added to the growth media. However, the addition of a fertilizer to the growth media is not strictly necessary because seed 116 typically contains the nutrients required for germinating and growing into a seedling. In some embodiments, seed kits may be provided without a growth medium and a user may obtain suitable growth media from a different source.

Seed kit 110 may optionally include one or more seeds 116. In some embodiments, seed 116 may be a seed of a tree (e.g., a perennial woody plant) or other plants. In general, however, seed kit 110 can be used to germinate a seed of any species and variety under suitable germinating conditions. Germination conditions for successful germination of seed 116 may include: the viability of seed 116; overcoming any dormancy issues that may prevent germination of seed 116; and the existence of proper environmental conditions (e.g., temperature, humidity, etc.). In other embodiments, seed kits may be provided without seeds 116 and a user may obtain suitable seeds 116 from a different source.

Seed kit 110 may optionally include a stiffing stick 135 which may be used to break up or level peat or to transfer a quantity of peat from seedling cup 112 to germination pad 120 to cover a germinated seed 116. Stirring stick 135 may be biodegradable. Seed kit 110 may also optionally include an instruction sheet 121, which provides instructions on how to use seed kit 110. Instruction sheet 121 may contain a sponsor's or advertiser's message. The message may be placed on the side opposite the instructions. Instruction sheet 121 may be made from recycled and/or biodegradable paper. If no instruction sheet is provided with seed kit 110, the user may obtain instructions on how to use seed kit 110 from a website (e.g., the website of the manufacturer of seed kit 110 or a sponsor).

Additional features of seed kit 110 will become evident with the explanation of the use of seed kit 110 to facilitate germination of seeds and growth of seedlings which is explained in more detail below.

Using seed kit 110 commences with placing germination pad 120 within germination cup 122 and against base 123 (FIG. 2). Water is added to moisten germination pad 120. Conveniently, lid/base 118 may be sized such that its secondary concavity 126 holds a desired amount (i.e., volume) of water for moistening germination pad 120. In other words, the user may fill secondary concavity 126 of lid/base 118 with water and use this amount of water to moisten germination pad 120. In some embodiments, the volume of secondary concavity 126 may be sized to hold a desired amount of water for repeated application to germination pad 120 (e.g. on a periodic basis) to maintain a desired moisture level of germination pad 120. For example, secondary concavity 126 may be sized to hold a desired daily amount of water for moistening germination pad 120 and maintaining the desired moisture level of germination pad 120.

Figure 4A:
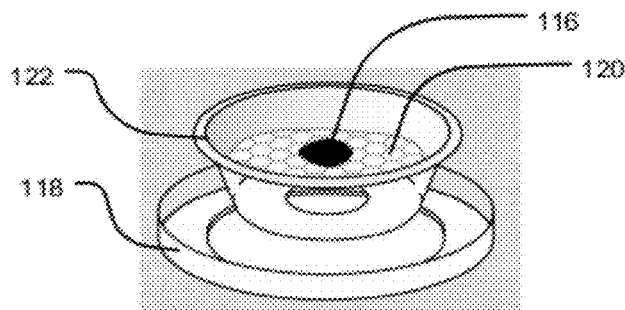
FIGS. 4A-4C show a method for using the components of a seed kit similar to the FIG. 1 seed kit to facilitate germination of a seed and growth of a seedling according to a particular embodiment.

Seed 116 may be placed in germination cup 122 atop moistened germination pad 120. The combination of germination cup 122, germination pad 120 and seed 116 may then be placed on lid/base 118 with concave surface 119 of lid/base 118 oriented upwardly to face the bottom of germination cup 122 (FIGS. 2 and 4A). In some embodiments, secondary concavity 126 of lid/base 118 may be sized and shaped to snugly receive base 123 of germination cup 122 to fix the location of germination cup 122 relative to lid/base 118. In the illustrated embodiment, secondary concavity is circularly shaped and its perimeter is sized to receive base 123 of germination cup 122, as shown best in FIG. 2. Water (e.g., an amount equal to the volume of secondary concavity 126 of lid/base 118) may be periodically (e.g., every 24 hours) added to germination cup 122 to keep germination pad 120 moist Seed 116 may optionally be stratified on moistened germination pad 120 within germination cup 122. Stratification is the process of treating seed 116, to simulate the winter conditions or dormancy period, seed 116 might experience before germinating. Most commercially available seeds have already been stratified; therefore, a stratification step may not be strictly necessary. However, a stratification step may be performed to provide an educational experience for the user. In some embodiments, a stratification procedure may involve exposing seed 116, moistened germination pad 120, and germination cup 122 to a temperature of between 0° C. and 6° C. (e.g., in a household or commercial refrigerator) for a period of time ranging from 24 hours to 3 months. Stratification temperatures and times may vary depending on the species and variety of seed 116. If stratification is performed for illustrative purposes only, placing seed 116, moistened germination pad 120, and germination cup 122 in a refrigerator for 24 to 48 hours will typically be sufficient.

After optional stratification, seed 116, moistened germination pad 120, and germination cup 122 are placed in an environment having suitable temperature, humidity, light and other conditions that are conducive to germination of seed 116. Desirable temperature, humidity and light conditions may depend on the species and variety of seed 116. Seed 116 may be placed in this environment until seed 116 has germinated (i.e., the seed coat has broken). Water (e.g., an amount equal to the volume of secondary concavity 126 of lid/base 118) may be periodically added to germination cup 122 to keep germination pad 120 moist. Use of germination pad 120 allows the user to observe the germination of seed 116 and confirm that seed 116 has germinated—i.e. since seed 116 rests atop germination pad 120. Additionally, the user gains an educational experience by observing the germination of seed 116.

Figure 3A:
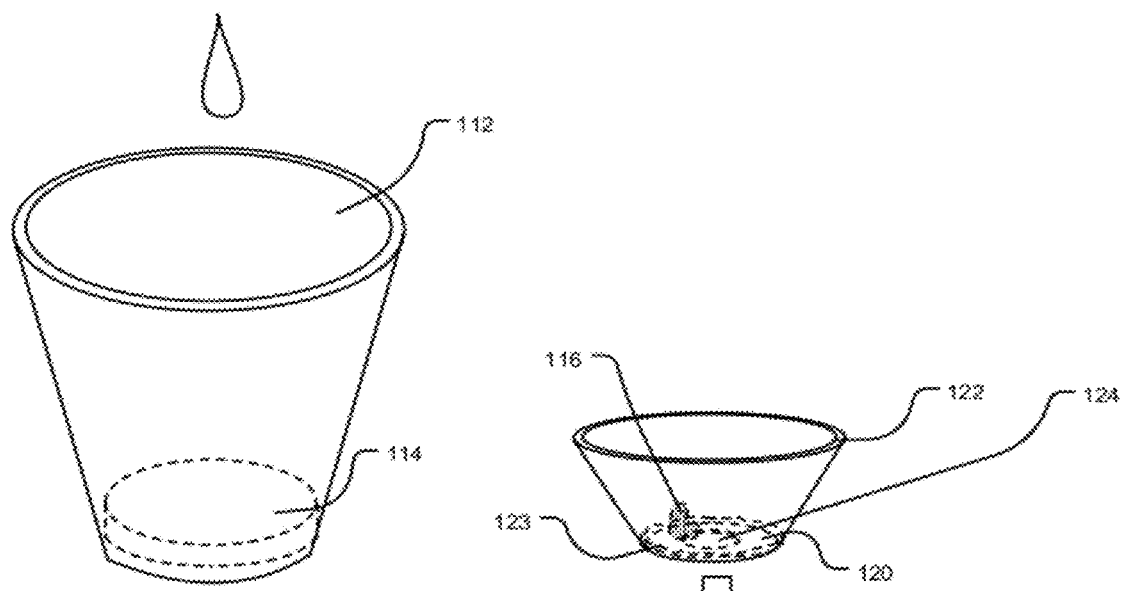
FIGS. 3A and 3B show the steps involved in using some components (i.e., a seedling cup, a peat pellet) of the FIG. 1 seed kit to nurture a germinated seed into a seedling.
Figure 3B:
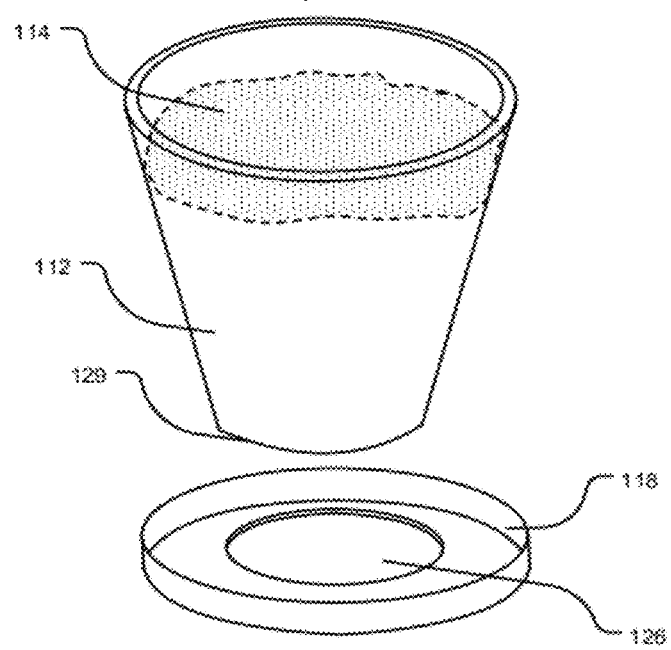
Figure 5A:
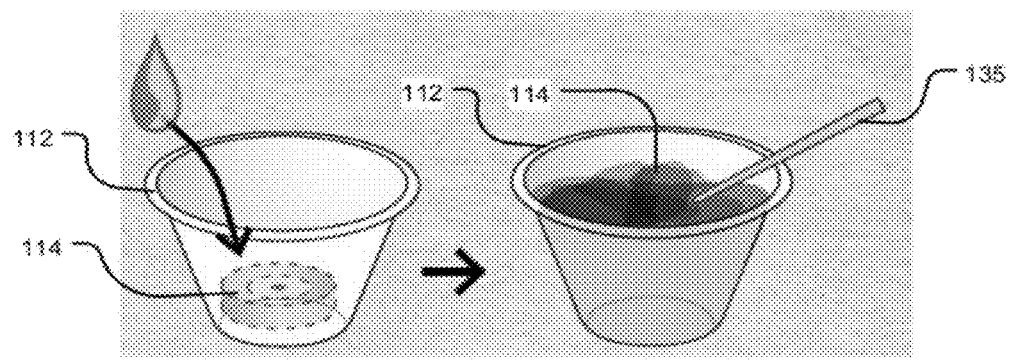
FIG. 5A shows the use of a stirring stick to break up or level wet peat pellet in a seedling cup of the FIG. 4 seed kit.

Once it has been observed that the coat of seed 116 has broken (i.e., seed 116 begins to germinate) atop moistened germination pad 120, seed 116, germination pad 120 and germination cup 122 are transferred to seedling cup 112, so that germinated seed 116 may continue to grow into a seedling in peat 114 or other suitable growth medium. Before putting germination cup 122 into seedling cup 112, peat pellet 114 is placed in seedling cup 112 (e.g., in a lower portion of seedling cup concavity 113) and water is added as shown in FIG. 3A. The addition of water causes peat pellet 114 to expand inside seedling cup 112 to form wetted peat 114 as shown in FIG. 3B. Advantageously, lid/base 118 may be sized, such that its primary concavity 127 holds a desired amount (i.e. volume) of water for wetting peat pellet 114. In other words, a user may fill primary concavity 127 of lid/base 118 with water and use this amount of water to wet peat pellet 114. In some embodiments, the volume of primary concavity 127 and/or secondary concavity 126 may be sized hold a desired amount of water for repeated application to peat 114 (e.g. on a periodic basis) to maintain a desired moisture level of peat 114. For example, primary concavity 127 or secondary concavity 126 may be sized to hold a desired daily amount of water for moistening peat 114 and maintaining the desired moisture level in wetted peat 114. In some embodiments, the volume of water (Vd) desirable to moisten peat pellet 114 on a periodic basis is equal to an integer (n) multiple of the volume (Vp) of primary concavity 127 or the volume (Vs) of secondary concavity 126. This can be expressed mathematically as $Vd=nVp$ or $Vd=nVs$, where n may be any positive integer, but is preferably in the range of 1 to 20. If desired, stirring stick 135 or other suitable tool may be used to loosen peat pellet 114, to stir water into peat 114, and/or to level wetted peat 114 as illustrated in FIG. 5A.

Figure 4B:
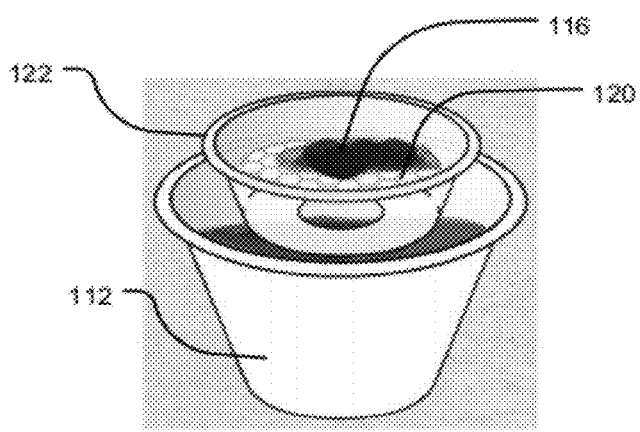
Figure 5B:
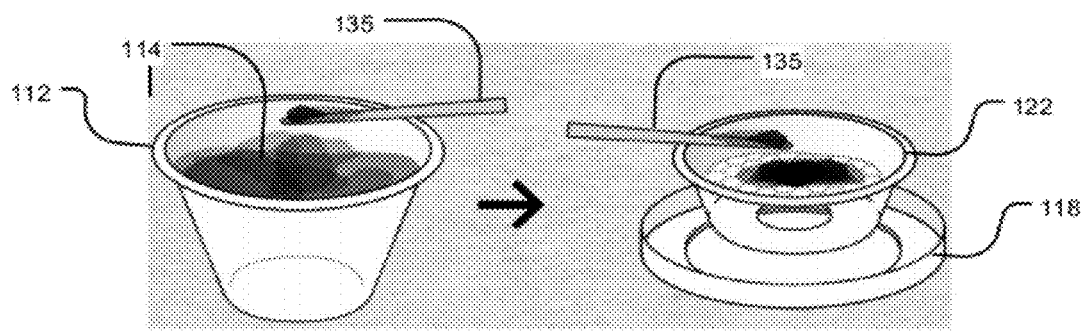
FIG. 5B shows the use of a stirring stick to move wet peat from a seedling cup to a germination cup of the FIG. 4 seed kit to thereby cover a germinated seed on a germination pad.

Once water has been added to peat 114, the combination of germination cup 122, germination pad 120 and germinated seed 116 may be placed atop wetted peat 114 in seedling cup 112. This is illustrated in FIGS. 3B and 4B. If desired, an amount of wetted peat 114 may be removed from seedling cup 112 and placed on top of germinated seed 116 on germination pad 120 in germination cup 122, for example, by using stirring stick 135 or other suitable implement (FIG. 5B). Seedling cup 112 may then be placed on lid/base 118 with the concave surface 119 (i.e. primary concavity 127) of lid/base 118 oriented upwardly to face seedling cup 112 (FIG. 3B). In some embodiments, secondary concavity 126 of lid/base 118 may be sized to snugly receive base 129 of seedling cup 112 to fix the location of seedling cup 112 relative to lid/base 118. Advantageously, using lid/base 118 as a support of seedling cup 112 may increase the stability of seedling cup 112, and/or contain the mess that results from growth medium or water leaking out from seedling cup 112.

Figure 4C:
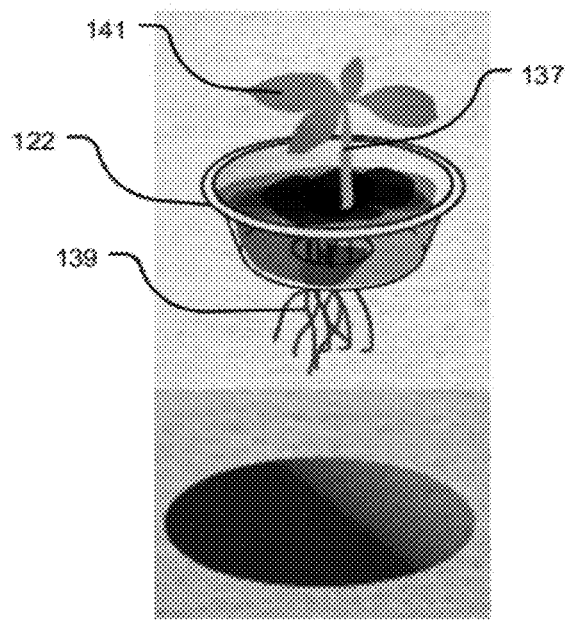

Germinated seed 116 will then grow into a seedling 137 as shown in FIG. 4C. The roots 139 of seedling 137 may penetrate germination pad 120. Germination pad 120 may be made of a fibrous or porous material (e.g., cotton) such that when wet with water it will soften to a point where roots 139 will penetrate through it (e.g. winding their way through the pores of germination pad 120). The roots 139 of seedling 137 may project through aperture 124 in germination cup 122 and into wetted peat 114 in seedling cup 112. The stem 141 and leaves of seedling 137 may project upwardly from germination cup 122. Water may be added to seedling cup 112 regularly to ensure that peat 114 remains moist. As discussed above, primary concavity 127 and/or secondary concavity 126 may be sized to accommodate this volume of water.

Seedling 137 may be placed in desirable light, temperature and humidity conditions where it may be permitted to continue to grow with roots 139 penetrating through aperture 139 and into peat 114 contained in seedling cup 112. It will be appreciated that the nature of the light, humidity and temperature conditions may differ for different species of seedlings 137. When seedling 137 has developed a firm stem 141, healthy roots 139 and healthy leaves, seedling 137 may be ready to be planted in soil. To plant seedling 137 in soil, a small hole may be dug in the location where it is desired for seedling 137 to grow into a tree. The hole should be deep and wide enough to be able to receive seedling cup 112. Then, the entirety of seedling cup 112 and its contents (peat, 114, germination cup 122, germination pad 120 and seedling 137)

may be inserted directly into the dug-out hole. Since seedling cup 112, germination cup 122 and germination pad 120 are biodegradable, they may be placed directly into the soil without removing seedling 137 from seedling cup 112. For most species, the time scale of germination and growth into a seedling is typically in the range of 1 to 8 weeks. Germination cup 122 and seedling cup 112 may be made of a material that will remain structurally intact for up to 8 weeks when wet or in contact with water, and will break down within 6 weeks when placed in soil. In some embodiments, germination cup 122 and seedling cup 112 are made of sugar cane bagasse or other suitable fibers. In some embodiments, the materials from which seedling cup 112, germination cup 122 and germination pad 120 are fabricated permit seedling cup 112, germination cup 122 and germination pad 120 to remain structurally intact when wet or in contact with water over a time period (e.g., T) typical for growing a seed into a viable seedling, but permit seedling cup 112, germination cup 122 and germination pad 120 to structurally break down (e.g. biodegrade) over a time period that is greater than or equal to ½T, but less than 2T. T may be 1, 2, 3, 4, 5, 6, 7, or 8 weeks. In some embodiments, the time period for the breakdown (e.g. biodegradation) of seedling cup 112, germination cup 122 and germination pad 120 may be greater than or equal to T, but less than 5T. In some embodiments, this time period is greater than 5T but less than 20T. In some embodiments, this time period is less than 30T.

In some embodiments, seedling 137, germination cup 122 and germination pad 120 may be gently removed as one unit from seedling cup 112 and peat 114 and may then be transplanted into soil without seedling cup 112 (FIG. 4C).

When seedling 137 is transplanted into soil, it may still be desirable to fertilize seedling 137 and to provide water to seedling 137. Seedling 137 will then mature into a healthy tree or other plant.

As will be apparent to those skilled in the art in the light of the foregoing disclosure, many alterations and modifications are possible in the practice of this invention without departing from the spirit or scope thereof. By way of non-limiting example:

The biodegradable materials used to fabricate germination cup 122, seedling cup 112 and/or germination pad 120 could be impregnated with fertilizing compounds which may be released when germination cup 122, seedling cup 112 and/or germination pad 120 degrade in soil, thereby proving further nutrients to a viable seedling.

Accordingly, the invention as set out in the following claims and any claims hereafter introduced should be understood and interpreted to include all such alterations, modifications, permutations, additions and sub-combinations within the scope of the invention.

What is claimed is:

1. A method for facilitating germination of a seed and growth of a seedling, the method comprising:
   providing a germination cup shaped to define a germination cup concavity, the germination cup concavity having an apertured base;
   placing a seed on a one-piece germination pad, the germination pad abutting against the apertured base while occupying substantially an entirety of the surface area thereof;
   moistening the germination pad by introducing water to the germination cup concavity, the water absorbed and retained by the germination pad, the germination pad being sufficiently rigid, when wetted with water, to avoid falling through the apertured base, the wetted germination pad providing the seed with moisture to promote germination;
   permitting roots of the germinated seed to extend downwardly, through the germination pad and through the apertured base;
   providing a seedling cup shaped to define a seedling cup concavity;
   accommodating the entire germination cup and the entire germination pad in the seedling cup concavity prior to use thereof for facilitating the germination of the seed and growth of the seedling;
   while in use to facilitate the germination of the seed and growth of the seedling, accommodating moistened growth medium in a lower portion of the seedling cup concavity and accommodating the germination cup containing the germination pad and seed in the seedling cup concavity directly atop the growth medium;
   permitting the roots of the germinated seed to extend downwardly, through the germination pad, through the apertured base and into the moistened growth medium, the moistened growth medium capable of sustaining the growth of the germinated seed into a viable seedling;
   providing a lid that is also operable as a base, the lid comprising a base surface which defines a primary concavity and a smaller, secondary concavity within the primary concavity;
   coupling a lid to a rim of the seedling cup to form, together with the seedling cup concavity, an enclosure for holding the entire germination cup and the entire germination pad prior to use thereof for facilitating the germination of the seed and growth of the seedling; and
   using the lid as a base by receiving the base of the germination cup in the secondary concavity, the base of the germination cup forming a snug fit with a perimeter of the secondary concavity.

2. The method according to claim 1 wherein the germination cup, germination pad and seedling cup are fabricated from biodegradable materials and wherein the method comprises planting the entirety of the seedling cup, the growth medium, the germination cup, the germination pad and the viable seedling into soil and growing the viable seedling into a mature plant while the seedling cup, germination cup and germination pad break down in the soil.

3. The method according to claim 1 wherein the germination cup concavity is shaped to provide an open upper end, the open upper end permitting placement of the seed in the germination cup and atop the germination pad through the open upper end, and the open upper end permitting observation of an interior of the germination cup concavity including the seed placed atop the germination pad through the open upper end.

4. The method according to claim 1 wherein moistening the germination pad by introducing water to the germination cup concavity comprises moistening the germination pad on a periodic basis, and wherein moistening the germination pad on a periodic basis comprises measuring an amount of water introduced to the germination cup concavity by filling the secondary concavity of the lid, the secondary concavity of the lid having a volume generally equal to a volume of water desirable to moisten the germination pad on a periodic basis.

5. The method according to claim 2 wherein the materials from which the germination pad, germination cup and seedling cup are fabricated permit the germination pad, germination cup and seedling cup to remain structurally intact when wet or in contact with water over a time period typical for growing a seed into a viable seedling, but permit the germination pad, germination cup and seedling cup to structurally break down in soil over a duration of time greater than or equal to half this time period, but less than two times this time period.

6. The method according to claim 1 comprising: providing a dried medium pellet and moistening the pellet to provide the moistened growth medium, wherein a volume of water desirable to moisten the dried medium pellet on a periodic basis and to thereby provide the moistened growth medium is generally equal to an integer multiple of a volume of the primary concavity.

7. The method according to claim 1 wherein the apertured base is shaped to define a single aperture in a center thereof, and wherein permitting roots of the germinated seed to extend downwardly, through the germination pad and through the apertured base comprises permitting the roots to extend downwardly through the single aperture.

8. A method for facilitating germination of a seed and growth of a seedling, the method comprising:
   providing a germination cup shaped to define a germination cup concavity, the germination cup concavity having an apertured base;
   placing a seed on a one-piece germination pad, the germination pad abutting against the apertured base while occupying substantially an entirety of the surface area thereof;
   moistening the germination pad by introducing water to the germination cup concavity, the water absorbed and retained by the germination pad, the germination pad being sufficiently rigid, when wetted with water, to avoid falling through the apertured base, the wetted germination pad providing the seed with moisture to promote germination;
   permitting roots of the germinated seed to extend downwardly, through the germination pad and through the apertured base;
   providing a seedling cup shaped to define a seedling cup concavity;
   accommodating the entire germination cup and the entire germination pad in the seedling cup concavity prior to use thereof for facilitating the germination of the seed and growth of the seedling;
   while in use to facilitate the germination of the seed and growth of the seedling, accommodating moistened growth medium in a lower portion of the seedling cup concavity and accommodating the germination cup containing the germination pad and seed in the seedling cup concavity directly atop the growth medium;
   permitting the roots of the germinated seed to extend downwardly, through the germination pad, through the apertured base and into the moistened growth medium, the moistened growth medium capable of sustaining the growth of the germinated seed into a viable seedling;
   providing a lid that is also operable as a base, the lid comprising a base surface which defines a primary concavity and a smaller, secondary concavity within the primary concavity;
   coupling a lid to a rim of the seedling cup to form, together with the seedling cup concavity, an enclosure for holding the entire germination cup and the entire germination pad prior to use thereof for facilitating the germination of the seed and growth of the seedling; and
   using the lid as a base by receiving a base of the seedling cup in the secondary concavity, the base of the seedling cup forming a snug fit with a perimeter of the secondary concavity.

9. The method according to claim 8 wherein moistening the germination pad by introducing water to the germination cup concavity comprises moistening the germination pad on a periodic basis, and wherein moistening the germination pad on a periodic basis comprises measuring an amount of water introduced to the germination cup concavity by filling the secondary concavity of the lid, the secondary concavity of the lid having a volume generally equal to a volume of water desirable to moisten the germination pad on a periodic basis.

10. The method according to claim 8 wherein the germination cup, germination pad and seedling cup are fabricated from biodegradable materials and wherein the method comprises planting the entirety of the seedling cup, the growth medium, the germination cup, the germination pad and the viable seedling into soil and growing the viable seedling into a mature plant while the seedling cup, germination cup and germination pad break down in the soil.

11. The method according to claim 8 wherein the germination cup concavity is shaped to provide an open upper end, the open upper end permitting placement of the seed in the germination cup and atop the germination pad through the open upper end, and the open upper end permitting observation of an interior of the germination cup concavity including the seed placed atop the germination pad through the open upper end.

12. The method according to claim 10 wherein the materials from which the germination pad, germination cup and seedling cup are fabricated permit the germination pad, germination cup and seedling cup to remain structurally intact when wet or in contact with water over a time period typical for growing a seed into a viable seedling, but permit the germination pad, germination cup and seedling cup to structurally break down in soil over a duration of time greater than or equal to half this time period, but less than two times this time period.

13. The method according to claim 8 comprising: providing a dried medium pellet and moistening the pellet to provide the moistened growth medium, wherein a volume of water desirable to moisten the dried medium pellet on a periodic basis and to thereby provide the moistened growth medium is generally equal to an integer multiple of a volume of the primary concavity.

14. The method according to claim 8 wherein the apertured base is shaped to define a single aperture in a center thereof, and wherein permitting roots of the germinated seed to extend downwardly, through the germination pad and through the apertured base comprises permitting the roots to extend downwardly through the single aperture.

* * * * *